No. 700,821. Patented May 27, 1902.
D. RALSTON.
APPARATUS FOR TRANSPLANTING TREES.
(Application filed Jan. 7, 1901.)
(No Model.) 2 Sheets—Sheet 1.
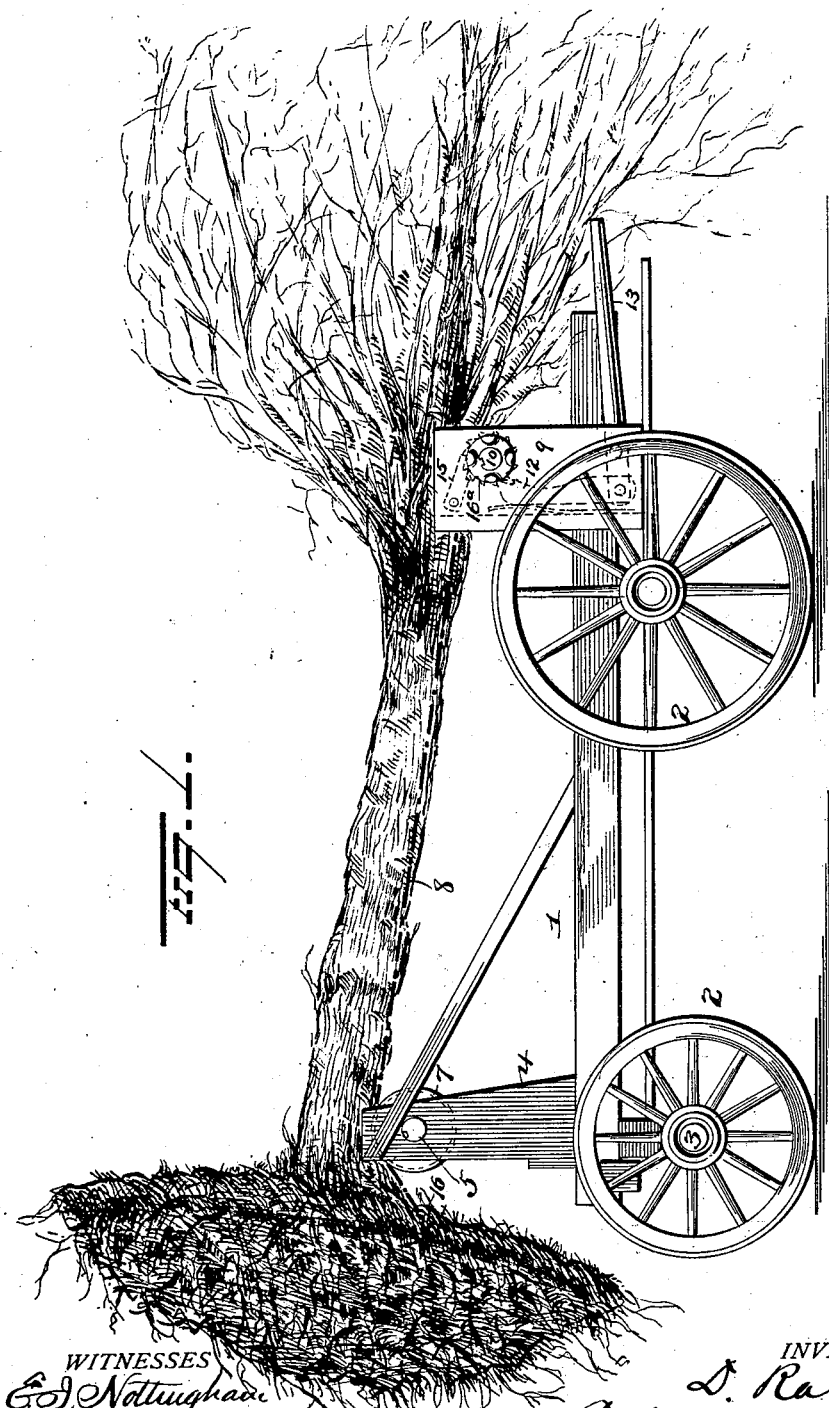

No. 700,821. Patented May 27, 1902.
D. RALSTON.
APPARATUS FOR TRANSPLANTING TREES.
(Application filed Jan. 7, 1901.)
(No Model.) 2 Sheets—Sheet 2.
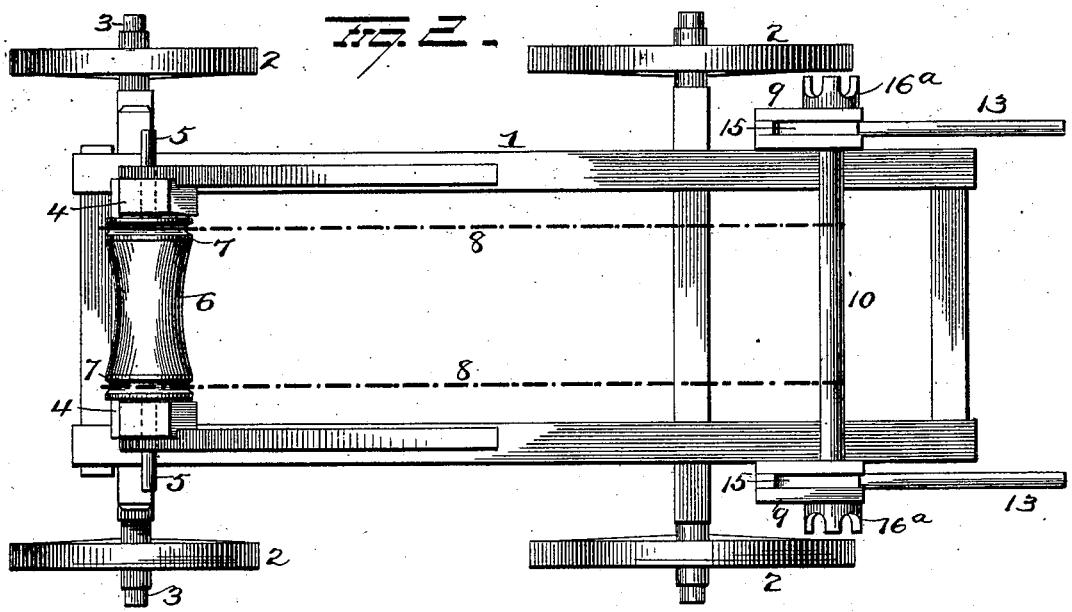
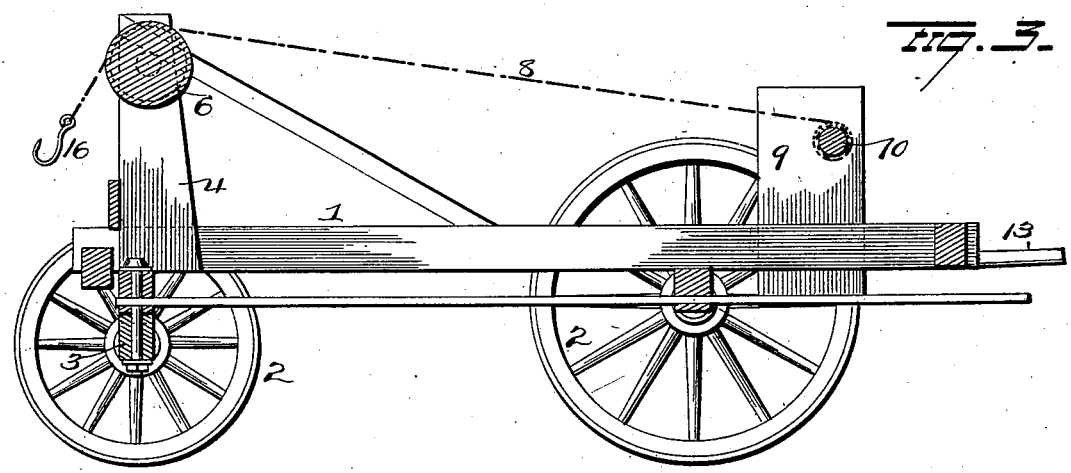
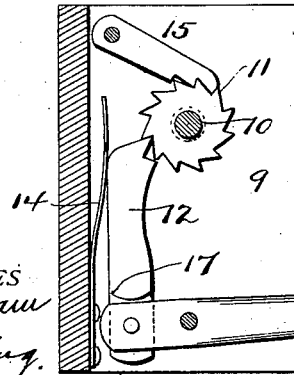
WITNESSES
E. J. Nottingham
G. F. Downing
INVENTOR
D. Ralston
By H. A. Seymour
Attorney

UNITED STATES PATENT OFFICE.

DAVID RALSTON, OF ALLENHURST, NEW JERSEY, ASSIGNOR OF TWO-THIRDS TO J. M. RALSTON AND E. N. RALSTON, OF ALLENHURST, NEW JERSEY.

APPARATUS FOR TRANSPLANTING TREES.

SPECIFICATION forming part of Letters Patent No. 700,821, dated May 27, 1902.

Application filed January 7, 1901. Serial No. 42,416. (No model.)

*To all whom it may concern:*

Be it known that I, DAVID RALSTON, a resident of Allenhurst, in the county of Monmouth and State of New Jersey, have invented certain new and useful Improvements in Apparatus for Transplanting Trees; and I do hereby declare the following to be a full, clear, and exact description of the invention, such as will enable others skilled in the art to which it appertains to make and use the same.

My invention relates to an improved apparatus for transplanting trees, the object of the invention being to provide a device of this character which will be extremely simple in construction and operation and strong, durable, and efficient when in use.

With this object in view the invention consists in certain novel features of construction and combinations and arrangements of parts, as will be more fully hereinafter described, and pointed out in the claims.

In the accompanying drawings, Figure 1 is a view illustrating my improvements. Fig. 2 is a plan view. Fig. 3 is a view in vertical section of the same, and Fig. 4 is an enlarged detail view of the power-transmitting mechanism.

1 represents a strong heavy body mounted on wheels 2, the front wheels being journaled on an axle 3, pivoted between its ends to the body, so as to facilitate the manipulation of the vehicle. Standards 4 are secured to the front end of the body and are provided near their upper ends with alined bearings for a shaft 5, which projects at its respective ends beyond the standards 4 and has secured thereon between the standards a drum 6, preferably provided with a concave periphery, and grooved pulleys or sheaves 7 are secured to the respective ends of the drum 6 to form guideways for chains or cables 8, as will more fully hereinafter appear.

Upright casings 9 are secured to opposite sides of the body 1, near its rear end, and are made with alined bearings for a shaft 10, which latter projects beyond the casings at each end, as shown.

Ratchet-wheels 11 are secured on the shaft 10 in the respective casings and are engaged by dogs 12, pivotally connected at their ends in the bifurcated ends of long levers 13, which latter are pivoted between their ends, and flat springs 14 are secured in the casings and bear against the dogs 12 to force them into engagement with the ratchet-wheels. Pawls 15 are pivotally supported at their ends above the ratchet-wheels 11, and the toothed free ends thereof are held in engagement with the ratchet-wheel by the weight of the pawls and prevent return of the ratchet-wheels and shaft after being moved by the levers and dogs.

The chains or cables 8, above referred to, are secured to the shaft 10, between the casings 9, and are passed over the pulleys 7 and provided on their free ends with hooks 16, and ratchet-blocks 16ª are secured on the free ends of the shaft 10 to permit the lowering of the tree, as will be explained, and are adapted to be disconnected from the shaft 10 and secured on shaft 5 when desired.

The operation of my improvements is as follows: When it is desired to uproot a tree, or, in other words, remove it from the ground, the earth is loosened all around the roots of the tree and the chains or cables 8 passed beneath the roots and the hooks 16 joined together. The levers 13 are now operated to turn the ratchet-wheels 11 and shaft 10, on which they are secured, and wind the chain on said shaft. When the tree has been removed sufficiently from the ground to topple over, it is forced against drum 6, and the passage of the chains 8 over the pulleys or sheaves 7 will revolve the drum 6 and assist in raising the tree from the ground and support it on the same, guy-ropes being used to secure the tree in the position shown in Fig. 1. The vehicle, with the tree thereon, can now be moved to the point of transplanting, where previously a hole has been dug. The levers 13 are now raised to their highest position to engage shoulders 17 on the dogs 12 and force them out of the path of the ratchet-wheel, and a crowbar or like tool is inserted between the arms of the ratchet-blocks 16ª to hold the shaft 10 against rotation, when the pawls 15 can be raised out of the path of the ratchet-wheel and the shaft permitted to revolve slowly by the weight of the tree drawing on the chains 8 until the tree is in position in the ground. If desired, the ratchet-blocks 16ª can be removed from the shaft 10 and secured on shaft 5, as above explained, to lower the tree into the ground.

The ratchet-blocks 16ª can be operated alone to raise the tree from the ground or as an aid to the levers and are especially adapted for lowering the tree into the ground, as a great leverage is secured by means of the blocks, and hence a great power exerted to lift the tree or to slowly lower the same.

Various slight changes might be resorted to in the general form and arrangement of the several parts described without departing from the spirit and scope of my invention, and hence I do not wish to be limited to the precise details set forth, but consider myself at liberty to make such changes as fairly fall within my invention.

Having fully described my invention, what I claim as new, and desire to secure by Letters Patent, is—

1. A transplanter comprising a frame, a drum, a shaft in rear of the drum, chains adapted at one end for attachment to a tree and secured at the rear end to said shaft, the intermediate positions of the chains passing over the drum to rotate it, and a ratchet device for rotating said shaft to wind the chains thereon, turn the drum and pull the tree over the latter.

2. A transplanter comprising a frame, a drum revolubly mounted thereon, a shaft revolubly mounted on the frame in rear of the drum, a ratchet-wheel secured on said shaft, a lever, a dog connected to the lever for rotating the ratchet-wheel when the lever is operated, a pawl adapted to engage the ratchet-wheel and prevent return thereof, pulleys rigid with the ends of said drum, chains secured to the shaft and passing over the said pulleys to rotate the drum and hooks on the ends of the chains adapted to be joined together beneath the roots of a tree.

3. A transplanter comprising a frame, a drum revolubly supported at one end of the frame, a shaft revolubly supported on the frame in rear of the drum, grooved pulleys secured to the ends of the drum, chains secured to the shaft and passed over the pulleys to rotate the drum and simultaneously pull a tree over the same, hooks on the ends of the chains adapted to be joined together beneath the roots of a tree, and ratchet-blocks, each having a series of notches for the reception of a crowbar, on the shaft.

4. In an apparatus for transplanting trees, the combination with a body mounted on wheels, of standards secured to said body near one end thereof, a shaft supported in said standards and projecting beyond the same at both ends, a drum secured on said shaft between the standards, grooved pulleys secured to rotate with the drum, another shaft revolubly supported on said body in rear of the first-mentioned shaft, chains secured to said last-mentioned shaft and passing over the pulleys so as to rotate the drum and simultaneously pull a tree over the same, said chains being adapted to be attached to a tree, means for rotating said shaft, and ratchet-blocks, each having a series of notches for the reception of a crowbar for attachment to either of said shafts for governing the speed of rotation of said shafts.

5. In a transplanter, the combination with a frame, of a drum mounted thereon provided with rigid pulleys, a shaft in rear of the drum, chains wound on said shaft and passing over said pulleys so as to rotate the drum and pull a tree over the same when the shaft is rotated and ratchet-blocks located on the shaft in rear of the drum and each block having recesses for the reception of a crowbar, substantially as and for the purpose set forth.

In testimony whereof I have signed this specification in the presence of two subscribing witnesses.

DAVID RALSTON.

Witnesses:
WM. H. CONOVER,
E. H. BENJAMIN.